United States Patent
Naito et al.

(10) Patent No.: US 6,882,522 B2
(45) Date of Patent: Apr. 19, 2005

(54) PRODUCTION METHOD OF SOLID ELECTROLYTIC CAPACITOR

(75) Inventors: Kazumi Naito, Chiba (JP); Isao Kabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/767,382

(22) Filed: Jan. 30, 2004

(65) Prior Publication Data

US 2004/0233614 A1 Nov. 25, 2004

Related U.S. Application Data

(60) Provisional application No. 60/445,820, filed on Feb. 10, 2003.

(30) Foreign Application Priority Data

Jan. 31, 2003 (JP) .......................................... 2003-23072

(51) Int. Cl.⁷ ................................................ H01G 9/00
(52) U.S. Cl. ..................... 361/523; 361/524; 29/25.03; 252/62.2
(58) Field of Search ................................. 361/523, 524, 361/525, 528–529, 532; 29/25.03; 252/62.2

(56) References Cited

U.S. PATENT DOCUMENTS

| | | | |
|---|---|---|---|
| 4,805,074 A | * 2/1989 | Harakawa et al. | 361/525 |
| 6,206,937 B1 | * 3/2001 | Kudoh et al. | 29/25.03 |
| 6,522,527 B1 | * 2/2003 | Kojima et al. | 361/523 |
| 6,552,896 B1 | * 4/2003 | Igaki et al. | 361/523 |

* cited by examiner

*Primary Examiner*—Anthony Dinkins
(74) *Attorney, Agent, or Firm*—Sughrue Mion, PLLC

(57) ABSTRACT

The present invention relates to a method for producing a niobium-oxide solid electrolytic capacitor having an anode being at least one member selected from niobium monoxide, niobium and an alloy mainly comprising niobium, or a mixture of niobium monoxide with niobium or an alloy mainly comprising niobium, which capacitor formed by the electrolytic oxidation (electrochemical formation) of the anode; and the method including sequentially repeating twice or more a step of exposing a dielectric layer to a temperature to 1,000° C. before formation of a cathode and a step of re-electrochemically forming the dielectric layer. The niobium solid electrolytic capacitor obtained by the present invention improved in the leakage current value after mounting and excellent in reliability.

18 Claims, No Drawings

PRODUCTION METHOD OF SOLID ELECTROLYTIC CAPACITOR

CROSS REFERENCE TO THE RELATED APPLICATIONS

This is an application filed pursuant to 35 U.S.C. Section 111(a) with claiming the benefit of U.S. Provisional application Ser. No. 60/445,820 filed Feb. 10, 2003 under the provision of 35 U.S.C. Section 111(b), pursuant to 35 U.S.C. Section 119(e)(1).

TECHNICAL FIELD

The present invention relates to a solid electrolytic capacitor with low equivalent series resistance (ESR) and high reliability, and a production method of the capacitor.

BACKGROUND ART

The capacitor for use in electronic devices such as cellular phone and personal computer is demanded to have a large capacitance with a small size. Among these capacitors, a tantalum solid electrolytic capacitor has a large capacitance for the size and also has good performance and therefore, this capacitor is preferably used. In order to increase the capacitance further, studies are made on a solid electrolytic capacitor using a dielectric layer mainly comprising niobium oxide having a higher dielectric constant. This niobium-based solid electrolytic capacitor is constituted such that the anode is niobium monoxide, niobium, an alloy mainly comprising niobium, or a mixture of niobium monoxide with niobium or an alloy mainly comprising niobium, the dielectric layer is a layer formed by electrolytic oxidation of the anode and mainly comprising niobium oxide, and the cathode is a semiconductor. For obtaining good ESR value of the capacitor, it is studied to use a highly electrically conducting organic semiconductor as the semiconductor. However, when a highly electrically conducting organic semiconductor is used for the cathode of a solid electrolytic capacitor and the produced capacitor is packaged on a circuit board or the like, there arises a problem that the leakage current (hereinafter, sometimes simply referred to as "LC") value of the capacitor greatly increases due to heat of soldering at the packaging.

DISCLOSURE OF THE INVENTION

The present invention provides a niobium-based solid electrolytic capacitor where when a highly electrically conducting organic semiconductor is used for the cathode of the niobium-based solid electrolytic capacitor and the produced capacitor is mounted on a circuit board, the leakage current value of the capacitor does not greatly increase due to heat of soldering at the mounting, and also provide an electronic circuit and an electronic device each using the capacitor.

As a result of intensive investigations for solving the above-described problem, the present inventors have found that the increase of LC at mounting is ascribable to the thermal instability of the dielectric layer and when an operation of remedying the thermal deterioration of LC is applied twice or more at the formation of the dielectric layer, the problem can be solved. The present invention has been accomplished based on this finding.

That is, the present invention relates to a method for producing a solid electrolytic capacitor, a solid electrolytic capacitor obtained by the method, and an electronic circuit and an electronic device each using the solid electrolytic capacitor, which are described below.

1. A method for producing a solid electrolytic capacitor comprising an anode, a dielectric layer and a cathode formed on the dielectric layer, the anode being at least one member selected from niobium monoxide, niobium and an alloy mainly comprising niobium, or a mixture of niobium monoxide with niobium or an alloy mainly comprising niobium, the dielectric layer being a layer formed by the electrolytic oxidation (electrochemical formation) of the anode, and the cathode being an organic semiconductor, the method comprising sequentially repeating twice or more a step of exposing the dielectric layer to a temperature of 200 to 1,000° C. before formation of the cathode and a step of re-electrochemically forming the dielectric layer.

2. The method for producing a solid electrolytic capacitor as described in 1 above, wherein the step of exposing the dielectric layer to a temperature of 200 to 1,000° C. is performed in the atmosphere containing water vapor.

3. The method for producing a solid electrolytic capacitor as described in 1 or 2 above, wherein the step of exposing the dielectric layer to a temperature of 200 to 1,000° C. is performed in the atmosphere containing oxygen gas of 5% by volume or more.

4. The method for producing a solid electrolytic capacitor as described in any one of 1 to 3 above, wherein the leakage current value of the dielectric layer after re-electrochemical formation is 1 nA/CV or less.

5. The method for producing a solid electrolytic capacitor as described in 1 above, wherein the organic semiconductor is at least one selected from an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

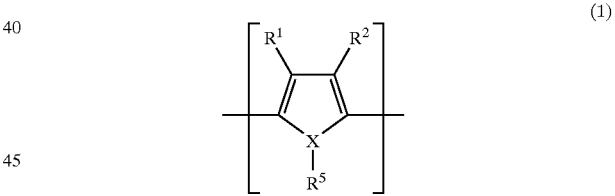

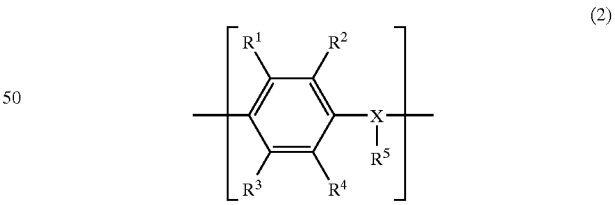

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring structure.

6. The method for producing a solid electrolytic capacitor as described in 5 above, wherein the polymer containing a repeating unit represented by formula (1) is polymer containing a structure unit represented by the following formula (3) as a repeating unit:

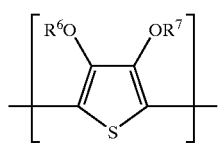

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

7. The method for producing a solid electrolytic capacitor as described in 5 above, wherein the polymer is selected from polyaniline, polyoxyphenylene, polyphenylene sulfide, polythiophene, polyfuran, polypyrrole, polymethylpyrrole, and substitution derivatives and copolymers thereof.

8. The method for producing a solid electrolytic capacitor as described in 7 above, wherein the polymer is poly(3,4-ethylenedioxythiophene).

9. The method for producing a solid electrolytic capacitor as described in 1 above, wherein the organic semiconductor has an electrical conductivity of $10^{-1}$ to $10^3$ S/cm.

10. The method for producing a solid electrolytic capacitor as described in 1 above, wherein the anode is a sintered body or a foil.

11. The method for producing a solid electrolytic capacitor as described in 1 above, wherein the alloy mainly comprising niobium is selected from niobium-tantalum alloy, niobium-zirconium alloy or niobium-silicon alloy.

12. The method for producing a solid electrolytic capacitor as described in 10 above, wherein the specific surface area of the sintered body is from 0.2 to 7 $m^2/g$.

13. The method for producing a solid electrolytic capacitor as described in 1 above, wherein a lead wire formed of a material selected from niobium, partially nitrided niobium, partially oxidized niobium and tantalum is electrically or mechanically connected to the anode.

14. The method for producing a solid electrolytic capacitor as described in 1 above, wherein the exposure of the dielectric layer to a temperature of 200 to 1,000° C. is performed for 10 seconds to 100 hours.

15. The method for producing a solid electrolytic capacitor as described in 1 above, wherein an electrically conducting layer is formed on an organic semiconductor layer.

16. A solid electrolytic capacitor produced by the production method described in any one of 1 to 15 above.

17. An electronic circuit using the solid electrolytic capacitor described in 16 above.

18. An electronic device using the solid electrolytic capacitor described in 16 above.

Mode for Carrying Out the Invention

One embodiment of the method for producing a capacitor of the present invention is described below.

The anode for use in the present invention is principally niobium monoxide, niobium, an alloy mainly comprising niobium or a mixture of niobium monoxide with niobium or an alloy mainly comprising niobium. In the present specification, "mainly comprising" means to comprise the component in an amount of 50 mass % or more. The shape of the anode may by a sintered body, foil and the like. The sintered body principally used in the present invention is obtained by sintering a powder comprising the same components as the anode or slurry containing the powder. This powder is produced by methods according to U.S. Pat. No. 6,387,150, WO03/050829 and WO03/091466 or a conventionally known method.

The alloy mainly comprising niobium is preferably a niobium-tantalum alloy, niobium-zirconium alloy or niobium-silicon alloy. The production method of the sintered body for use in the present invention is not particularly limited, but the sintered body is obtained, for example, by press-molding the powder into a predetermined shape and heating it at 500 to 2,000° C. for one minute to ten hours under $10^{-1}$ to $10^{-5}$ Pa. The specific surface area of the sintered body generally used in the present invention is from 0.2 to 7 $m^2/g$.

A lead wire formed of a material preferably selected from niobium, partially nitrided niobium, partially oxidized niobium, and tantalum may be electrically or mechanically connected to the anode (at the stage of the molded article before sintering or after the molded article is sintered, in the case that the anode is a sintered body).

The dielectric layer formed on the surface of the anode is a layer mainly comprising niobium oxide. This layer mainly comprises $Nb_2O_5$ and in some cases, $NbO_2$ is partially present. The dielectric layer is formed by the electrolytic oxidation (also called "electrochemical formation") of the anode. For example, the electrochemical formation is performed by a conventionally known method of dipping the anode in a solution of an acid such as phosphoric acid or an acid containing a salt and applying a voltage between the anode and a separately prepared metal plate for cathode, such as Ta or platinum.

In the present invention, the anode having thereon a dielectric material is exposed to a temperature of 200 to 1,000° C., preferably a temperature of 200 to 500° C. where the environmental measures for preventing excessive oxidation of the anode are easily taken, more preferably a temperature of 230 to 500° C. where the purpose can be achieved within a relatively short time, the dielectric layer is then re-electrochemically formed, and these steps of high-temperature treatment and re-electrochemical formation are further repeated once or more, whereby the dielectric layer is stabilized.

This exposure to a high temperature is performed for 10 seconds to 100 hours. The exposure to a high temperature may be performed under reduced pressure, atmospheric pressure or applied pressure. The exposure to a high temperature may be performed in an atmosphere of air or a gas such as Ar, $N_2$ and He, and preferably in the atmosphere containing water vapor of 0 to 100% by volume, more preferably 60 to 100% by volume, still more preferably 90 to 100% by volume, or in the atmosphere containing oxygen gas of 5% by volume or more. Or when the high-temperature treatment is performed while supplying water vapor and oxygen gas of 5% by volume or more at the same time, in this order or in the reverse order, the stabilization of the dielectric layer more proceeds and the leakage current (LC) value after mounting of the produced capacitor is more improved.

The oxygen gas of 5% by volume or more can be prepared, for example, by a method of diluting oxygen gas with a gas such as Ar, $N_2$ and He. The water vapor can be supplied, for example, by a method of supplying water vapor generated due to heat from a water reservoir placed in the heat-treatment furnace.

In the above, the maximum temperature at the time of exposing the anode having thereon a dielectric material to a high-temperature atmosphere is described. Before reaching this temperature, the temperature of the anode having thereon a dielectric material may be gradually elevated from a low temperature to reach the maximum temperature. The method for elevating the temperature may be arbitrarily selected. Incidentally, there arises no problem even when the above-described maximum temperature undergoes fluctuation due to properties of the apparatus, for example, fluctuation of about ±50° C. Also, the temperature may be set to give an artificial thermal fluctuation at the maximum temperature and this basically causes no problem.

The re-electrochemical formation may be performed in the same manner as the above-described method for forming the dielectric layer. The LC value after re-electro-chemical formation (LC value after final re-electrochemical formation) varies depending on the kind of the anode, but based on the CV value (product of electrochemical forming voltage and the volume of the anode at that time) of the anode (especially when the anode is a sintered body), the LC value is normally adjusted to 1 nA/CV or less, preferably 0.5 nA/CV or less, more preferably 0.3 nA/CV or less. With this LC value, the produced electrolytic capacitor is advantageously improved in the initial LC performance. The re-electrochemical formation time is selected so that the above-described LC value can be achieved. The LC value after re-electrochemical formation as used in the present invention is an LC value measured with a voltage of 0.7 times the re-electrochemical forming voltage.

The number of times to repeat the operations of the high-temperature treatment and re-electrochemical formation steps varies depending on the CV value of powder used, the size of anode, the thickness of dielectric layer, or the like and this is determined by previously performing a preliminary experiment.

Specific examples of the organic semiconductor used as the cathode in the present invention include an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

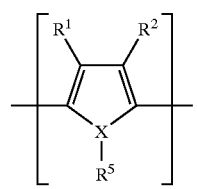

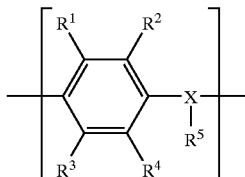

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring structure.

Preferred examples of the electrically conducting polymer containing a repeating unit represented by formula (1) for use in the present invention include an electrically conducting polymer containing a structure unit represented by the following formula (3) as a repeating unit:

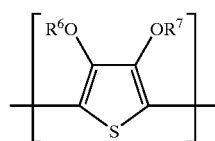

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the semiconductor used has an electrical conductivity of $10^{-1}$ to $10^3$ S/cm, the produced capacitor can have a small ESR value and this is preferred.

In the solid electrolytic capacitor of the present invention, an electrically conducting layer may be formed on the semiconductor layer formed by the above-described method, so that good electrical contact with the external drawing-out lead (for example, lead frame) can be obtained.

The electrically conducting layer can be formed, for example, by the solidification of an electrically conducting paste, plating, metallization, or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the other electrode and then, the entirety is molded with a material such as epoxy resin, thereby fabricating a solid electrolytic capacitor.

The capacitor having such a constitution of the present invention is jacketed, for example, by resin mold, resin case, metallic jacket case, resin dipping or laminate film and thereby, can be completed as a capacitor product for various uses.

The capacitor produced in the present invention can be preferably used, for example, for circuits using a high-capacitance capacitor, such as an electric power circuit. These circuits can be used in various digital devices such as a personal computer, server, camera, game machine, DVD, AV equipment and cellular phone, and electrical devices such as various electric power sources. In the solid electrolytic capacitor produced in the present invention, the leakage current hardly increases after mounting and therefore, by using this solid electrolytic capacitor, electronic circuits and electronic devices having less initial failure can be obtained.

EXAMPLES

The present invention is described in greater detail below by referring to Examples, however, the scope of the present invention is not limited by these Examples.

Examples 1 to 8

A niobium primary powder (average particle size: 0.8 $\mu$m) ground by utilizing the hydrogen embrittlement of a niobium ingot was granulated to obtain a niobium powder having an average particle size of 100 $\mu$m (this was a fine powder and therefore, naturally oxidized to contain 35,000 ppm of oxygen). The obtained niobium powder was left standing in a nitrogen atmosphere at 500° C. and then in Ar at 700° C. to provide a partially nitrided niobium powder (CV: 82,000/g) having a nitrided amount of 10,000 ppm. The resulting niobium powder was molded together with a 0.29 mm$\Phi$ niobium wire and then sintered at 1,320° C. In this way, a plurality of sintered bodies (anodes) having a size of 4.0× 3.5×1.7 mm (mass: 0.08 g) were produced. Each sintered body was electrochemically formed in an aqueous 0.1% phosphoric acid solution for 7 hours under conditions of 80° C. and 18 V to form a dielectric layer mainly comprising niobium oxide on the anode surface. The resulting anode having formed thereon a dielectric layer was heat-treated by leaving it in a furnace at a temperature shown in Table 1 under atmospheric pressure and thereafter, re-electrochemically formed in an aqueous 0.1% phosphoric acid solution under conditions of 80° C. and 13 V. The re-electrochemical formation time, the number of operations of performing heat-treatment and re-electrochemical formation, and the LC value after final re-electrochemical formation are shown in Table 1. Subsequently, the anode was subjected to electrolytic polymerization in an aqueous solution having dissolved therein a pyrrole monomer and anthraquinonesulfonic acid to form a semiconductor (cathode) comprising polypyrrole. After sequentially stacking carbon paste and silver paste on the cathode side, the stacked body was placed on a separately prepared lead frame working out to an external electrode such that the lead wire in the anode side and the silver paste part in the cathode side were lying on two protruded portions of the lead frame, respectively. The lead wire in the anode side and the silver paste part in the cathode side were then electrically/mechanically connected by spot-welding for the former and with silver paste for the latter. Thereafter, the entirety excluding a part of the lead frame was transfer-molded with epoxy resin and the lead frame outside the mold was cut and processed to produce a chip solid electrolytic capacitor having a size of 7.3×4.3×2.8 mm.

Example 9

Solid electrolytic capacitors were produced in the same manner as in Example 1 except that all heat-treatments were performed in water vapor. A petri dish having an inside diameter of 80 mm$\Phi$ and containing water in it was left standing in a heat treatment furnace (internal diameter: 400×400×400 mm) to thereby obtain the water vapor. After the air in the furnace was sufficiently purged with water vapor, the heat treatment was performed.

Example 10

Solid electrolytic capacitors were produced in the same manner as in Example 1 except that all heat-treatments were performed in a furnace filled with a 15% oxygen gas diluted with argon gas.

Example 11

Solid electrolytic capacitors were produced in the same manner as in Example 1 except that a niobium powder having a CV value of 120,000/g was used, all heat-treatments were performed in a furnace filled with a 45% oxygen gas diluted with argon, and the electrolytic polymerization was performed by using an ethylenedioxythiophene monomer in place of the pyrrole monomer to change the semiconductor to polyethylenedioxythiophene.

Comparative Examples 1 to 4

Solid electrolytic capacitors were produced in the same manner as in Example 1 except that neither heat-treatment nor re-electrochemical formation was performed (Comparative Example 1), re-electrochemical formation was performed once without performing heat-treatment (Comparative Example 2), heat-treatment was performed without performing re-electrochemical formation (Comparative Example 3), or heat-treatment and re-electrochemical formation each was performed once (Comparative Example 4).

Comparative Example 5

Solid electrolytic capacitors were produced in the same manner as in Example 1 except that the heat-treatment temperature was changed to 180° C.

Example 12

Solid electrolytic capacitors were produced in the same manner as in Example 1 except that the re-electrochemical formation time was shortened to give an LC value of 1.1 nA/CV after the final re-electrochemical formation.

Example 13

A niobium-tantalum primary powder having an average particle size of 0.6 $\mu$m, which was obtained by grinding niobium-tantalum alloy in place of a niobium ingot in Example 1, was granulated to obtain a niobium-tantalum alloy powder having an average particle size of 120 μm (naturally oxidized to contain 30,000 ppm of oxygen). In the same manner as in Example 1, the obtained niobium-tantalum alloy powder was left standing in a nitrogen atmosphere to provide a partially nitrided niobium-tantalum alloy powder (CV: 79,000/g) having a nitrided amount of 8,500 ppm. The resulting niobium-tantalum alloy powder was molded together with a 0.40 mmΦ niobium wire and then sintered at 1,360° C. In this way, plural sintered bodies were produced (the shape of the sintered body was the same as in Example 1 and the niobium wire was protruded by 3.2 mm to the inside of the sintered body and by 10 mm to the outside). Subsequently, each sintered body was electrochemically formed, heat-treated, electrochemically formed again, to form a semiconductor layer and to produce a capacitor under the same conditions in Example 1.

Example 14

A niobium-zirconium primary powder having an average particle size of 0.8 μm), which was obtained by grinding niobium-zirconium alloy (98% by mass of niobium) in place of a niobium ingot in Example 1, was granulated to obtain a niobium-zirconium alloy powder having an average particle size of 160 μm (naturally oxidized to contain 45,000 ppm of oxygen). The obtained niobium-zirconium alloy powder was left standing in a nitrogen atmosphere at 600° C. and then in Ar under the same conditions in Example 1 to provide a partially nitrided niobium-zirconium alloy powder (CV: 85,000/g) having a nitrided amount of 18,500 ppm. The resulting niobium-zirconium alloy powder was molded together with a 0.45 mmΦ niobium wire and then sintered at 1,340° C. In this way, plural sintered bodies were produced (the shape of the sintered body was the same as in Example 1 and the niobium wire was protruded by 3.2 mm to the inside of the sintered body and by 10 mm to the outside). Subsequently, each sintered body was electrochemically formed, heat-treated, electrochemically formed again, to form a semiconductor layer and to produce a capacitor under the same conditions in Example 1 except that the heat-treatment was performed in the atmosphere containing oxygen gas in an amount of 30%.

Example 15

A niobium-silicon primary powder having an average particle size of 0.7 μm), which was obtained by grinding niobium-silicon alloy (96% by mass of niobium) in place of a niobium ingot in Example 1, was granulated to obtain a niobium-silicon alloy powder having an average particle size of 90 μm (naturally oxidized to contain 40,000 ppm of oxygen). In this example, the obtained niobium-silicon alloy powder (CV: 130,000/g) was not left standing in a nitrogen atmosphere. The resulting niobium-silicon alloy powder was molded together with a 0.40 mmΦ niobium wire and then sintered at 1,300° C. In this way, plural sintered bodies were produced (the shape of the sintered body was the same as in Example 1 and the niobium wire was protruded by 3.2 mm to the inside of the sintered body and by 10 mm to the outside). Subsequently, each sintered body was electrochemically formed, heat-treated, electrochemically formed again; to form a semiconductor layer and to produce a capacitor under the same conditions in Example 9.

The initial performance and LC value (at 4 V) after mounting of each solid electrolytic capacitor produced in Examples 1 to 15 and Comparative Examples 1 to 5 are shown in Table 2. The mounting was performed by a method of attaching the solid electrolytic capacitor to a circuit board by cream soldering and passing the circuit board three times through a reflow furnace having a temperature pattern with a maximum temperature of 260° C. (230° C., 30 seconds). The LC value after mounting was a value within 30 minutes after passing through the reflow furnace. The ESR value at 100 kHz after mounting was 40 mΩ or less in all capacitors. In each Example, the value is an average of n=30 units.

TABLE 1

| | | Heat Treatment | | Re-Electro-chemical Formation Time, min. | Total Number of Operations (times) | LC/CV after Final Re-Electrochemical Formation, nA/μFV |
|---|---|---|---|---|---|---|
| | | Temperature, ° C. | Time, min. | | | |
| Example | 1 | 250 | 10 | 10 | 40 | 0.13 |
| | 2 | 250 | 100 | 10 | 40 | 0.18 |
| | 3 | 290 | 10 | 10 | 30 | 0.12 |
| | 4 | 290 | 100 | 10 | 30 | 0.17 |
| | 5 | 290 | 10 | 50 | 30 | 0.09 |
| | 6 | 380 | 10 | 10 | 15 | 0.20 |
| | 7 | 500 | 10 | 100 | 10 | 0.51 |
| | 8 | 210 | 10 | 10 | 55 | 0.23 |
| | 9 | 250 | 10 | 10 | 40 | 0.12 |
| | 10 | 250 | 10 | 10 | 40 | 0.10 |
| | 11 | 250 | 10 | 10 | 40 | 0.24 |
| | 12 | 250 | 10 | 10 | 40 | 1.10 |
| | 13 | 250 | 10 | 10 | 40 | 0.09 |
| | 14 | 250 | 10 | 10 | 40 | 0.12 |
| | 15 | 250 | 10 | 10 | 40 | 0.33 |
| Comparative Example | 1 | — | — | — | 0 | 1.12 |
| | 2 | — | — | 10 | 0 | 0.14 |
| | 3 | 250 | 10 | — | 0 | 1.61 |
| | 4 | 250 | 10 | 10 | 1 | 0.40 |
| | 5 | 180 | 10 | 10 | 40 | 0.16 |

TABLE 2

| | | Initial Value of Product | | LC after Mounting, μA | LC Rate of Change, LC after Mounting/Initial LC |
|---|---|---|---|---|---|
| | | Capacitance, μF | LC, μA | | |
| Example | 1 | 328 | 17 | 43 | 2.5 |
| | 2 | 330 | 21 | 53 | 2.5 |
| | 3 | 325 | 15 | 41 | 2.7 |
| | 4 | 320 | 20 | 55 | 2.8 |
| | 5 | 326 | 13 | 40 | 3.1 |
| | 6 | 318 | 16 | 58 | 3.6 |
| | 7 | 307 | 15 | 71 | 4.7 |
| | 8 | 333 | 19 | 57 | 3.0 |
| | 9 | 320 | 17 | 34 | 2.0 |
| | 10 | 321 | 16 | 36 | 2.3 |
| | 11 | 466 | 26 | 66 | 2.5 |
| | 12 | 319 | 84 | 148 | 1.8 |
| | 13 | 320 | 8 | 13 | 1.6 |
| | 14 | 340 | 16 | 31 | 1.9 |
| | 15 | 550 | 27 | 68 | 2.5 |
| Comparative Example | 1 | 323 | 128 | 1231 | 9.6 |
| | 2 | 330 | 19 | 287 | 15.1 |
| | 3 | 322 | 215 | 1634 | 7.6 |
| | 4 | 334 | 15 | 186 | 12.4 |
| | 5 | 328 | 28 | 179 | 6.4 |

As seen from comparison of results between Examples 1 to 8 and Comparative Examples 1 to 4, when the operation of heat-treating and then re-electrochemically forming the anode having formed thereon a dielectric layer is performed twice or more, the LC value is improved even after the mounting. Also, as seen from comparison of results between Examples 1 to 8 and Comparative Example 5, when the heat-treatment temperature is 200° C. or more, the LC value after mounting is improved. Furthermore, as seen from comparison of results between Examples 1 to 8 and Example 12, when the LC/CV value after re-electrochemical formation is set to 1 nA or less, the LC value at the initial stage of the manufactured solid electrolytic capacitor product is improved and the LC value after mounting is also improved.

INDUSTRIAL APPLICABILITY

According to the production method of the present invention, comprising repeating twice or more the steps of exposing the dielectric layer to a temperature of 200 to 1,000° C. before the cathode comprising an organic semiconductor is formed and then re-electrochemically forming the dielectric layer, a solid electrolytic capacitor improved in the leakage current (LC) value after mounting can be obtained.

What is claimed is:

1. A method for producing a solid electrolytic capacitor comprising an anode, a dielectric layer and a cathode formed on the dielectric layer, the anode being at least one member selected from niobium monoxide, niobium and an alloy mainly comprising niobium, or a mixture of niobium monoxide with niobium or an alloy mainly comprising niobium, the dielectric layer being a layer formed by the electrolytic oxidation (electrochemical formation) of the anode, and the cathode being an organic semiconductor, the method comprising sequentially repeating twice or more a step of exposing the dielectric layer to a temperature of 200 to 1,000° C. before formation of the cathode and a step of re-electrochemically forming the dielectric layer.

2. The method for producing a solid electrolytic capacitor as claimed in claim 1, wherein the step of exposing the dielectric layer to a temperature of 200 to 1,000° C. is performed in the atmosphere containing water vapor.

3. The method for producing a solid electrolytic capacitor as claimed in claim 1 or 2, wherein the step of exposing the dielectric layer to a temperature of 200 to 1,000° C. is performed in the atmosphere containing oxygen gas of 5% by volume or more.

4. The method for producing a solid electrolytic capacitor as claimed in claim 1 or 2, wherein the leakage current value of the dielectric layer after re-electrochemical formation is 1 nA/CV or less.

5. The method for producing a solid electrolytic capacitor as claimed in claim 1, wherein the organic semiconductor is at least one selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

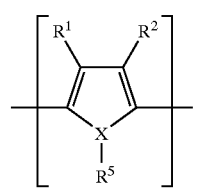

(1)

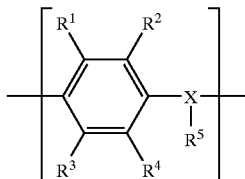

(2)

wherein $R^1$ to $R^4$, which may be the same or different, each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring structure.

6. The method for producing a solid electrolytic capacitor as claimed in claim 5, wherein the polymer containing a repeating unit represented by formula (1) is polymer containing a structure unit represented by the following formula (3) as a repeating unit:

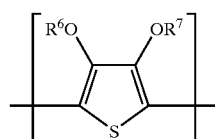

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

7. The method for producing a solid electrolytic capacitor as claimed in claim 5, wherein the polymer is selected from polyaniline, polyoxyphenylene, polyphenylene sulfide, polythiophene, polyfuran, polypyrrole, polymethylpyrrole, and substitution derivatives and copolymers thereof.

8. The method for producing a solid electrolytic capacitor as claimed in claim 7, wherein the polymer is poly(3,4-ethylenedioxythiophene).

9. The method for producing a solid electrolytic capacitor as claimed in claim 1, wherein the organic semiconductor has an electrical conductivity of $10^{-1}$ to $10^3$ S/cm.

10. The method for producing a solid electrolytic capacitor as claimed in claim 1, wherein the anode is a sintered body or a foil.

11. The method for producing a solid electrolytic capacitor as claimed in claim 1, wherein the alloy mainly comprising niobium is selected from niobium-tantalum alloy, niobium-zirconium alloy or niobium-silicon alloy.

12. The method for producing a solid electrolytic capacitor as claimed in claim 10, wherein the specific surface area of the sintered body is from 0.2 to 7 m²/g.

13. The method for producing a solid electrolytic capacitor as claimed in claim 1, wherein a lead wire formed of a material selected from niobium, partially nitrided niobium, partially oxidized niobium and tantalum is electrically or mechanically connected to the anode.

14. The method for producing a solid electrolytic capacitor as claimed in claim 1, wherein the exposure of the dielectric layer to a temperature of 200 to 1,000° C. is performed for 10 seconds to 100 hours.

15. The method for producing a solid electrolytic capacitor as claimed in claim 1, wherein an electrically conducting layer is formed on an organic semiconductor layer.

16. A solid electrolytic capacitor produced by the production method claimed in claim 1.

17. An electronic circuit comprising the solid electrolytic capacitor claimed in claim 16.

18. An electronic device comprising the solid electrolytic capacitor claimed in claim 16.

* * * * *